(12) United States Patent
Wengrovitz

(10) Patent No.: US 6,909,778 B2
(45) Date of Patent: Jun. 21, 2005

(54) ENHANCED IP PHONE OPERATION

(76) Inventor: Michael Wengrovitz, Concord, MA (US)

(*) Notice: Subject to any disclaimer, the term of this patent is extended or adjusted under 35 U.S.C. 154(b) by 469 days.

(21) Appl. No.: 09/966,155

(22) Filed: Sep. 28, 2001

(65) Prior Publication Data
US 2003/0021404 A1 Jan. 30, 2003

Related U.S. Application Data

(60) Provisional application No. 60/308,373, filed on Jul. 27, 2001.

(51) Int. Cl.$^7$ .......................... H04M 3/42; H04L 12/16; H04L 12/28; H04L 12/66
(52) U.S. Cl. .................. 379/201.01; 370/271; 370/352; 370/401; 370/466; 379/900
(58) Field of Search .................. 370/271, 352, 370/401, 466, 467; 379/201.01, 201.12, 219, 242, 900

(56) References Cited

U.S. PATENT DOCUMENTS

| | | | |
|---|---|---|---|
| 6,249,576 B1 * | 6/2001 | Sassin et al. .......... | 379/218.01 |
| 6,373,937 B1 | 4/2002 | Yegoshin | |
| 6,445,695 B1 * | 9/2002 | Christie, IV ............ | 370/352 |
| 6,542,475 B1 * | 4/2003 | Bala et al. .............. | 370/271 |

OTHER PUBLICATIONS

PCT Search Report dated Dec. 3, 2002, for PCT corresponding Application No. PCT/US02/23742, filed Jul. 26, 2002.
Alcatel OmniPCX 4400, Specifications; Jan. 15, 2001; 12 pp.
Alcatel OmniPCX 4400, Jan. 15, 2001; 20 pp.
Alcatel 4980 PC Telephony/Alcatel 4980 IP Telephony; Quick User Guide; 2 pp.
Internet papers: Alcatel pushes VoIP into branch office with new IP features for OmniPCX 4400; Feb. 6, 2001; 2 pp.

* cited by examiner

Primary Examiner—Harry S. Hong

(57) ABSTRACT

An enhanced IP telephone taking advantage of the many call-related functions provided by existing PBX systems. The enhanced IP telephone includes a thin computer telephony integration (CTI) client transmitting to a CTI server a command associated with a particular call-related function provided by a PBX unit. The CTI server translates the command to a PBX command, and transmits the PBX command to the PBX unit for providing the particular call-related function to the enhanced IP telephone. Instead of the thin CTI client, the enhanced IP telephone may include an enhanced IP signaling protocol stack for accessing the PBX functionality using its signaling protocol. A CTI translator translates the enhanced signaling command to a CTI command for transmitting to the CTI server.

39 Claims, 7 Drawing Sheets

ENHANCED IP PHONE OPERATION

CROSS-REFERENCE TO RELATED APPLICATIONS

This application claims the benefit of U.S. provisional application No. 60/308,373 filed on Jul. 27, 2001, the content of which is incorporated herein by reference.

FIELD OF THE INVENTION

This invention relates generally to internet telephony, and more particularly, to internet protocol telephones enhanced with functionality provided by existing private branch exchange systems.

BACKGROUND OF THE INVENTION

Internet protocol (IP) telephones used for Internet telephony via signaling protocols such as, H.323 or Session Initiation Protocol (SIP), already exist in the prior art. Although these signaling protocols may make some provisions for additional functionality, such as multiparty conferencing with other SIP and H.323 devices, they do not take advantage of the powerful existing functionality already found within most private branch exchange (PBX) systems. PBX systems provide such functionality as automatic call distribution, messaging, voice mail, conferencing, call hold, dial-by-name, and the like. Existing Internet telephony signaling protocols do not include specific provisions for accessing such PBX functionality. Specifically, signaling protocols such as H.323 and SIP have been designed to work without the use of a PBX.

The existence of Computer Telephony Integration (CTI) technology does not aid in providing PBX functionality to IP phones. Generally speaking, CTI is a technology through which computers add intelligence to telephone networks. CTI is typically applied to a personal computer (PC) with an associated standard telephone to access the functionality of a PBX. A CTI client resident within the PC typically exploits functionality residing within the PC, such as ActiveX, OLE, dlls, and the like, to access the PBX functionality. For example, a call may be initiated by clicking a name in a contact management PC program instead of dialing the number on the telephone.

FIG. 1 is a schematic block diagram of a traditional CTI system conventional in the art. The system includes a CTI-enabled desktop 10 including a PC and a traditional telephone set 14. A software application 18 resident in the PC 12 is used to access a functionality provided by a PBX 20 via a CTI client 16 also resident in the PC. The CTI client transmits commands to a CTI server 22 via an internet protocol (IP) network 24 associated with the accessed functionality. The CTI server 22 receives the CTI commands from the PC 12, translates them to PBX commands, and transmits the PBX commands to the PBX for invoking an action on the PBX 20. Communication ensues with the telephone set 14 via the PBX 20 over a telephone network 26. Existing CTI architectures, however, are not applicable to IP telephones.

One approach in allowing IP phones to utilize the existing PBX functionality is PBX redesign. PBX redesign exposes the internal features of the PBX to vendor-specific IP phones, allowing IP phones to interact directly with the PBX without intermediate servers. Unfortunately, PBX redesign and vendor-specific IP phones have the following limitations. First, with PBX redesign, an enterprise may be generally forced to only use the vendor-specific IP phone with the vendor-specific PBX. As such, customer choice may be eliminated, severely impacting an enterprise migration plan. For example, an enterprise may have multiple types of PBXs and may wish to decouple the choice of the IP phone from the types of existing or future PBX systems.

Second, with PBX redesign, many of the vendor-specific IP phones may be able to make/place calls to/from the PBX itself, but not from other standardized IP phones and IP voice gateways. Third, for the vendor to make changes to the internal PBX system, the PBX system may have to be modified to expose the functionality to IP clients. This may require substantial development effort on the part of the vendor and may further require each enterprise to install the modified PBX system.

Consequently, what is needed is a solution that exposes the PBX functionality that is typically associated with custom vendor digital sets or CTI-based PC desktop applications to IP phone clients. Specifically, a solution is needed that enhances IP phone clients with powerful functionality already resident within many existing PBX systems.

SUMMARY OF THE INVENTION

It should be appreciated, therefore, that the present system significantly enhances and simplifies the enterprise migration path to enable IP phones to access PBX functionality with existing PBX and IP network infrastructure. No special PBX units nor PBX redesign is required to provide the PBX functionality to the IP phones.

DESCRIPTION OF THE DRAWINGS

These and other features, aspects and advantages of the present invention will be more fully understood when considered with respect to the following detailed description, appended claims, and accompanying drawings where:

DETAILED DESCRIPTION OF THE SPECIFIC EMBODIMENTS

Figure 2:
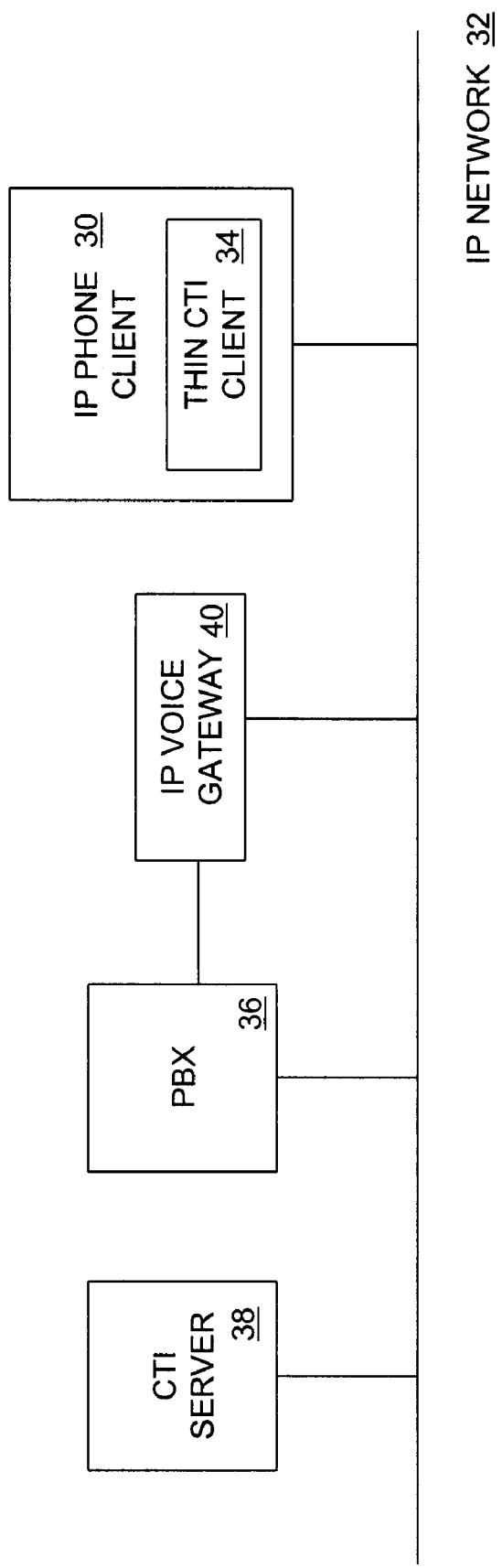
FIG. 2 is a schematic block diagram of a system for providing PBX functionality to an IP telephone according to one embodiment of the invention.

FIG. 2 is a schematic block diagram of a system for providing PBX functionality to an IP telephone according to one embodiment of the invention. The system preferably includes an IP client 30 residing in the IP telephone (not shown). The IP telephone is preferably a dedicated Internet telephony appliance preferably including a keypad, function buttons, handset, display, and an Internet connection. Unlike a general purpose PC with Internet telephony capabilities, the IP telephone is a dedicated appliance that preferably incorporates the look and feel of a traditional telephone while allowing telephone conversations over an IP network 32.

The receiving and transmitting of IP telephony calls over the IP network 32 is performed via the IP client through an IP voice gateway 40 in a conventional manner. The IP client 30 preferably includes a thin CTI client 34 for communicating with a CTI server 38 over the IP network 32. The CTI server 38 accesses functions provided by a PBX 36 and makes it available to the IP client 30 via its CTI client 34. Such PBX functions include automatic call distribution, messaging, voice mail, conferencing, call hold, dial-by-name, and the like.

The thin CTI client 34 is preferably a stripped-down version of the conventional CTI client 16 resident in the PC 12. For instance, the thin CTI client need not include graphics and commands specific to the operating system utilized in the PC 12. Depending on the processing power and available memory of the IP client 10, however, the thin CTI client 34 may include all or portions of the excluded portions of a conventional CTI client 16.

The CTI server 38 may take the form of any conventional CTI server interacting with conventional CTI clients resident in PCs. As such, the CTI server 38 may support conventional CTI protocols such as, for example, CSTA, Genesys CTI, CTConnect, TSAPI, TAPI, and/or the like. According to one embodiment of the invention, the CTI server 38 is dedicated to a particular type of PBX. In another embodiment of the invention, the CTI server 38 functions with multiple types of PBXs, and is not limited to only one type.

The PBX 36 and IP voice gateway 40 may similarly take the form of any conventional PBX unit and IP voice gateway existent in the art. The PBX 36 is preferably a generic PBX unit, and not a PBX unit customized to interact with the IP client 30.

Figure 1:
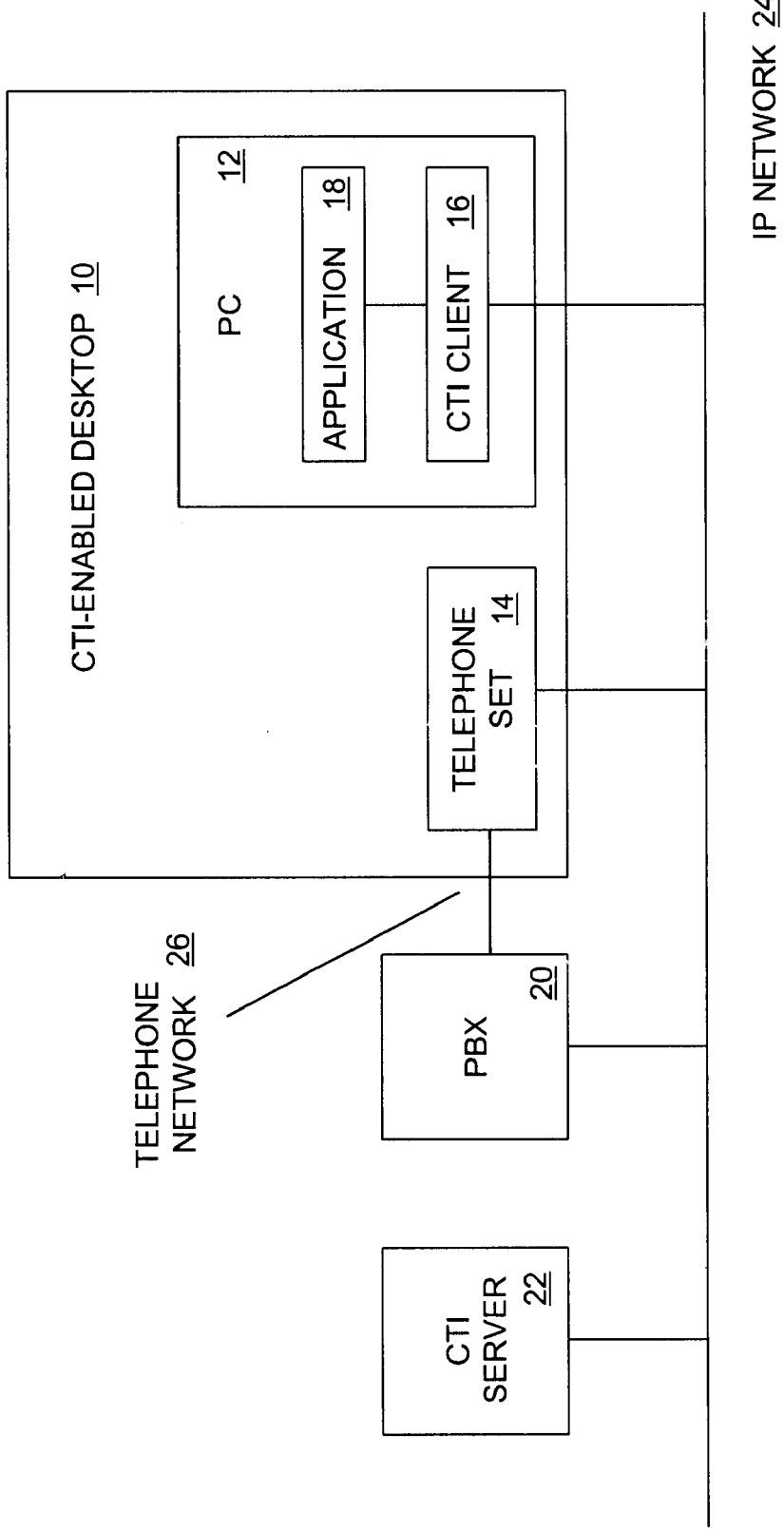
FIG. 1 is a schematic block diagram of a traditional CTI system conventional in the art.

Although in the embodiment illustrated in FIG. 1, the PBX 36 and IP voice gateway 40 are depicted as two separate components of the system, a person skilled in the art should recognize that the functionality of the two components may reside in a single IP-enabled PBX. Such an IP-enabled PBX preferably provides IP gateway functionality as well as PBX switching fabric and functionality according to conventional methods.

In general terms, the thin CTI client 34 transmits a CTI command to the CTI server 38 via the IP network 32. The CTI command preferably corresponds to desired functionality to be invoked in the PBX 36.

The CTI server 38 receives the CTI command over the IP network 32. The CTI server 38 preferably converts the CTI command to a corresponding PBX command according to conventional methods, and communicates the converted command to the PBX 36. Voice input and output to/from the PBX 36 is transmitted from/to the IP client 30 via the IP voice gateway 40 which converts the voice into IP data packets, and transmits these data packets over the IP network 32.

Figure 3:
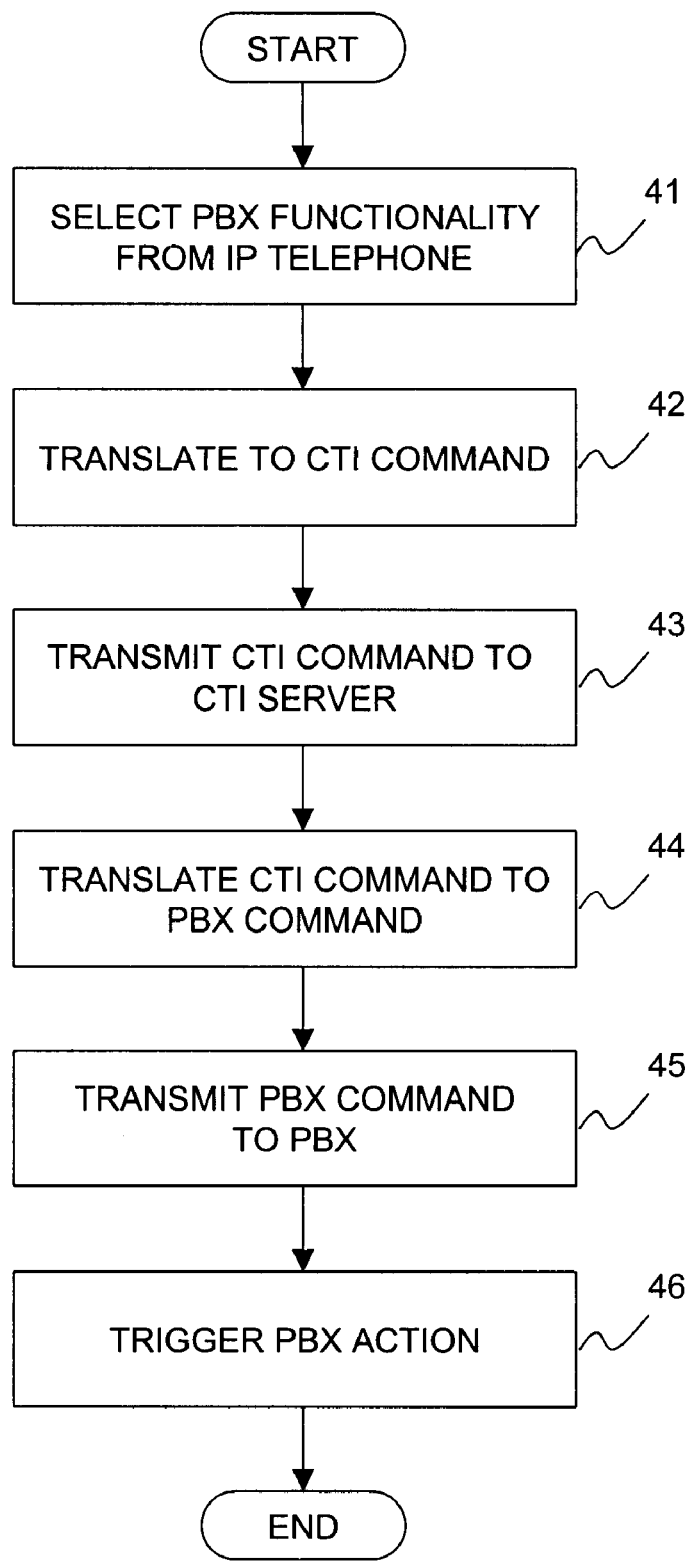
FIG. 3 is a flow diagram of a process for invoking PBX functionality from an IP telephone according to one embodiment of the invention.

FIG. 3 is a flow diagram of a process for invoking PBX functionality from an IP telephone according to one embodiment of the invention. The process starts, and in step 41, a user of the IP telephone selects a particular PBX functionality. This may be accomplished for instance, via selection of pre-programmed buttons on the IP telephone, menu input selection, and/or via any other selection method conventional in the art. For instance, the user of the IP telephone may select a conference button on the telephone for initiating a multi-party conference call via the PBX 36.

In step 42, the thin CTI client 34 preferably translates the selected PBX function to a CTI command using standard conversion mechanisms. In the above example, the selection of the multi-party conference call button may cause creation of a "CONF" CTI command having as parameters the telephone numbers of the parties to be conferenced.

In step 43, the thin CTI client 34 transmits the CTI command to the CTI server 38 over the IP network 32. In step 44, the CTI server 38 translates the CTI command to a PBX command. The PBX command is transmitted to the PBX 36 in step 45. The PBX receives the command and triggers an appropriate PBX action in step 46. For instance, in the event that the PBX 36 receives a command to initiate a conference call, the PBX initiates the conference call by placing the appropriate telephone calls and informing the IP client 30 via the IP voice gateway 40 of the status of the call. If successful, voice communication ensues via the PBX 36 and IP voice gateway 40 in a conventional manner.

Figure 4:
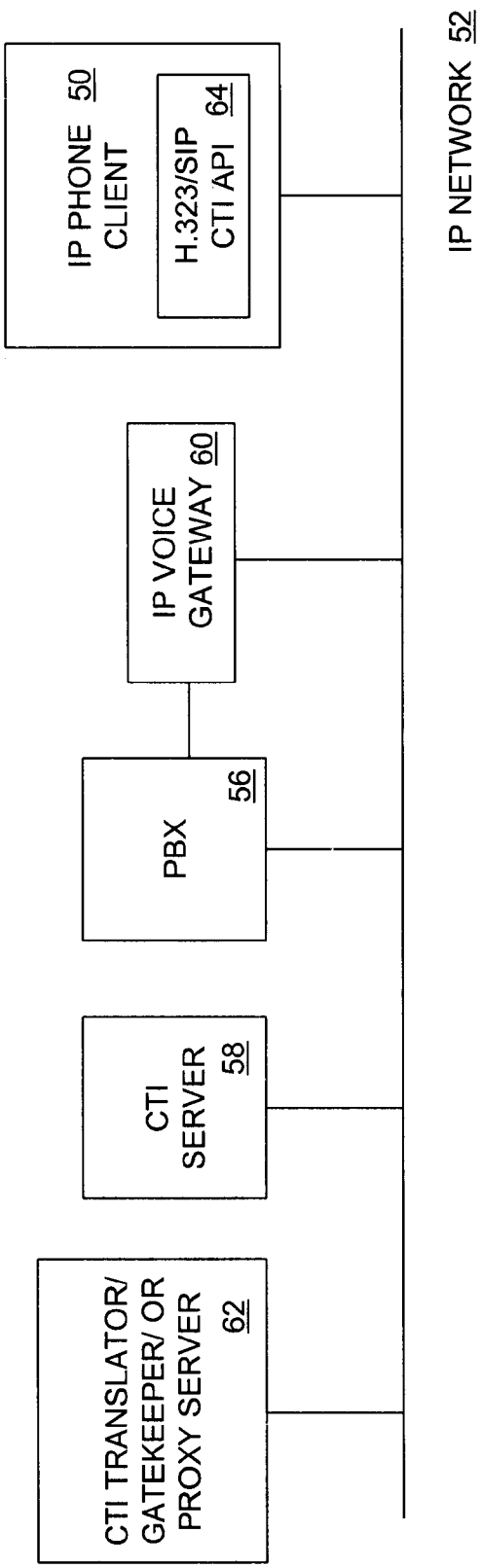
FIG. 4 is a schematic block diagram of a system for providing PBX functionality to an IP telephone according to another embodiment of the invention.

FIG. 4 is a schematic block diagram of a system for providing PBX functionality to an IP telephone according to another embodiment of the invention. The system preferably includes an IP client 50, CTI server 58, PBX 56, and IP voice gateway 60 which may be similar to the IP client 30, CTI server 38, PBX 36, and IP voice gateway 40 of FIG. 2. Instead of an embedded thin CTI client, however, the IP client 50 illustrated in FIG. 4 includes an enhanced IP signaling protocol stack 64 for accessing the functionality provided by a PBX 56. Preferably, the enhanced IP signaling protocol stack 64 includes a conventional IP signaling protocol stack such as, for example, an H.323 protocol stack, SIP protocol stack, or another protocol stack conventional in the art. The protocol stack 64, however, is enhanced with additional signaling commands for accessing the PBX functionality. The additional signaling commands allow the IP client 50 to utilize its signaling protocol to access the PBX functionality via a CTI server 58 without the need of a separate CTI client.

Preferably the system illustrated in FIG. 4 includes a CTI translator 62 which receives the enhanced signaling command from the enhanced IP signaling protocol stack 64, translates the signaling command to a CTI command, and transmits it to the CTI server 58. The CTI translator 62 may be a software module residing in a stand-alone server, or may be incorporated in existing devices, such as, for example, an H.323 gatekeeper, SIP proxy server, and/or the like.

Figure 5:
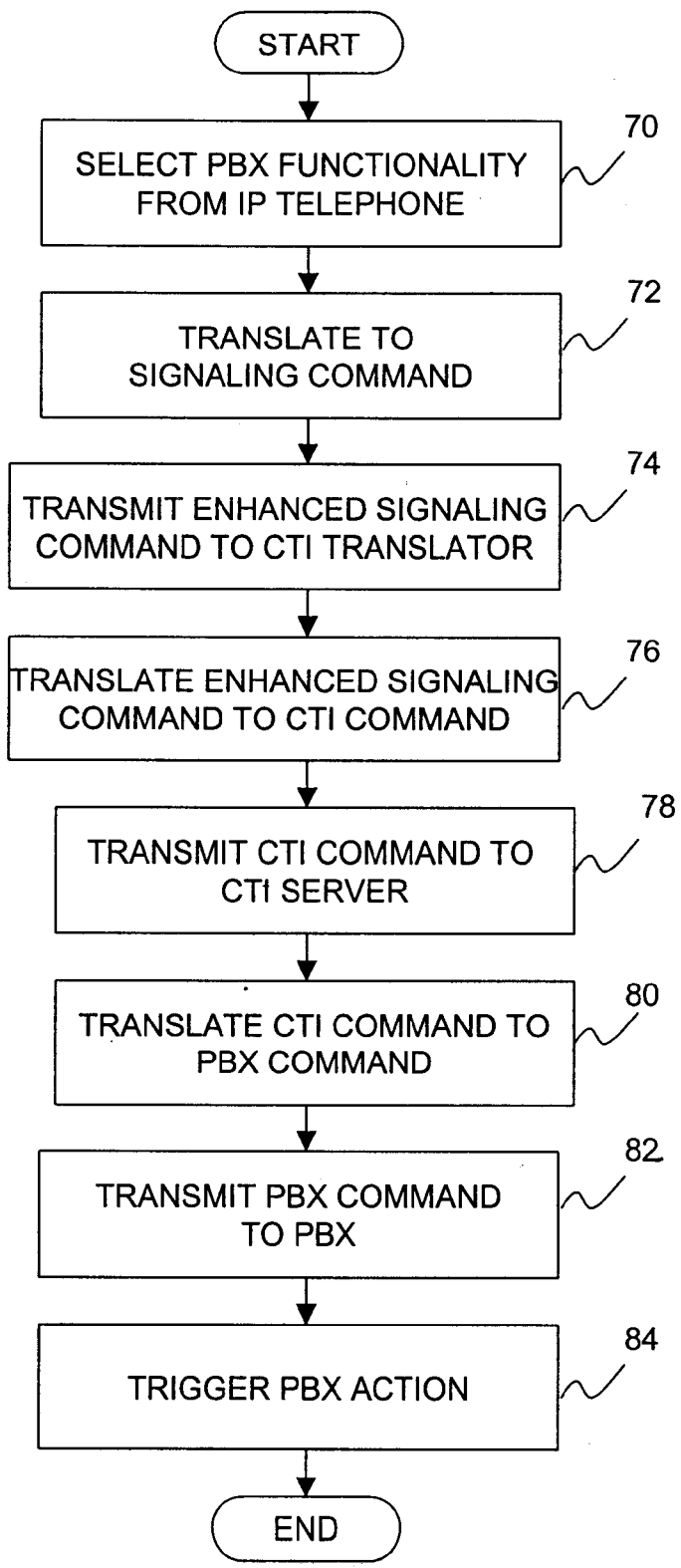
FIG. 5 is a flow diagram of a process for invoking PBX functionality from an IP telephone according to the embodiment illustrated in FIG. 4.

FIG. 5 is a flow diagram of a process for invoking PBX functionality from an IP telephone according to the embodiment illustrated in FIG. 4. The process starts, and in step 70, a user of the IP telephone selects a particular PBX functionality. This may be accomplished for instance, via any of the selection mechanisms described above with respect to FIG. 3.

In step 72, the enhanced signaling protocol stack 64 preferably translates the selected PBX functionality to an enhanced signaling command. In step 74, the enhanced signaling protocol stack transmits the enhanced signaling command to the CTI translator 62 over the IP network 52. In step 76, the CTI translator translates the enhanced signaling command to a CTI command. The translation may be implemented in any conventional manner, such as, for example, via a database lookup of the received signaling command for retrieval of a corresponding CTI command.

In step 78, the CTI translator transmits the CTI command to the CTI server 58. In step 80, the CTI server 58 translates the CTI command to a PBX command. The PBX command is transmitted to the PBX 56 in step 82. The PBX receives the command and triggers an appropriate PBX action in step 84.

Figure 6:
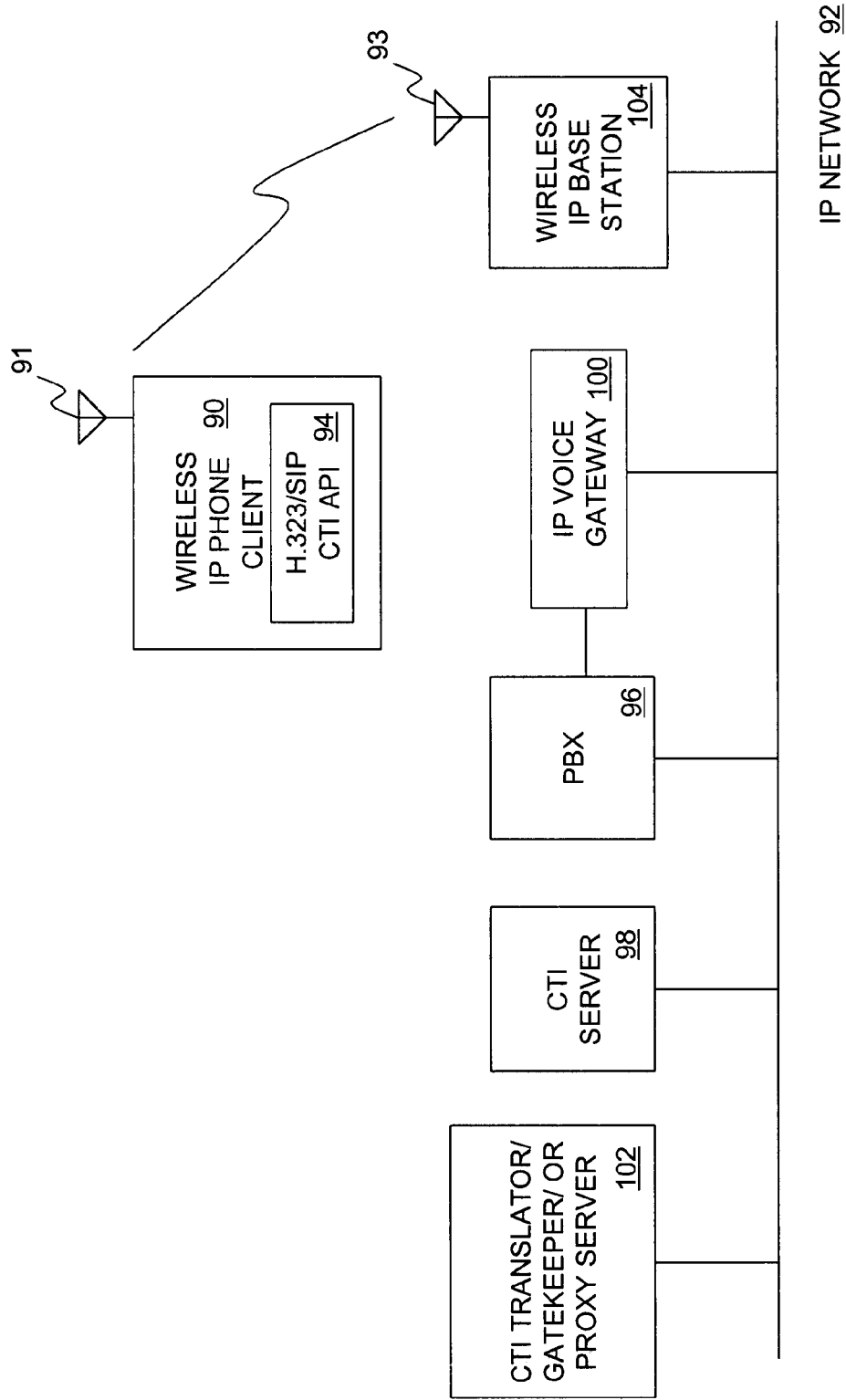
FIG. 6 is a schematic block diagram of a system for providing PBX functionality to a wireless IP telephone according to another embodiment of the invention.

FIG. 6 is a schematic block diagram of a system for providing PBX functionality to a wireless IP telephone according to another embodiment of the invention. A person skilled in the art should recognize that the wireless IP telephone may be replaced with a portable digital assistant with IP telephony functions and/or another wireless IP telephony appliance conventional in the art.

The system illustrated in FIG. 6 preferably includes a CTI translator 102, CTI server 98, PBX 96, and IP voice gateway 100 which may be similar to the CTI translator 62, CTI server 58, PBX 56, and IP voice gateway 60 of FIG. 4. In addition to the above, the system includes a wireless IP client 90 communicating with a wireless IP base station 104. The wireless IP client 90 includes an enhanced IP signaling protocol stack 94 for accessing the functionality provided by the PBX 96. The enhanced IP signaling protocol stack 94 may be similar to the enhanced IP signaling protocol stack 64 of FIG. 4.

The wireless IP client 90 preferably includes an RF transmitter and antenna 91 for transmitting RF signals associated with commands generated by the enhanced IP signaling protocol stack 94, and the wireless IP base station 104 includes an RF receiver and antenna 93 for receiving the RF signals.

A person skilled in the art should recognize that the enhanced IP signaling protocol stack 94 may be replaced with a thin CTI client (not shown) such as the thin CTI client 34 of FIG. 2. In this scenario, the CTI translator 102 is not necessary since the thin CTI client 34 communicates directly with the CTI server 98 for invoking the PBX functionality.

Figure 7:
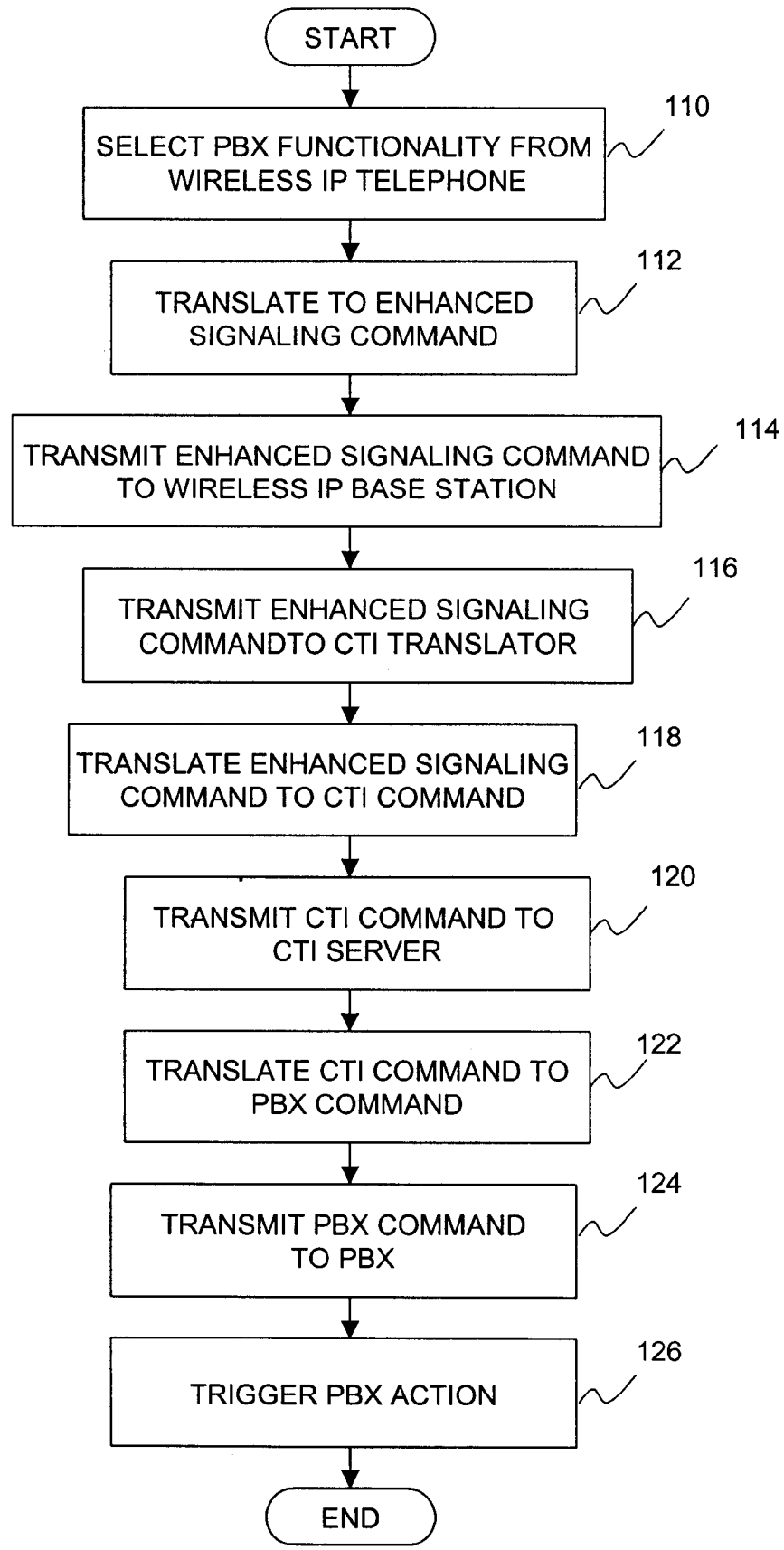
FIG. 7 is a flow diagram of a process for invoking PBX functionality from a wireless IP telephone according to the embodiment illustrated in FIG. 6.

FIG. 7 is a flow diagram of a process for invoking PBX functionality from a wireless IP telephone according to the embodiment illustrated in FIG. 6. The process starts, and in step 110, a user of the IP wireless device selects a particular PBX functionality. This may be accomplished for instance, via any of the selection mechanisms described above with respect to FIG. 3.

In step 112, the enhanced signaling protocol stack 94 preferably translates the selected PBX functionality to an enhanced signaling command. In step 114, the enhanced signaling protocol stack transmits the enhanced signaling command to the wireless IP base station 104 using RF signals. In step 116, the wireless IP base station 104 transmits the enhanced signaling command to the CTI translator 102 over the IP network 92. In step 118, the CTI translator translates the signaling command to a CTI command. The translation may be implemented in any conventional manner, such as, for example, via a database lookup of the received signaling command for retrieval of a corresponding CTI command.

In step 120, the CTI translator transmits the CTI command to the CTI server 98. In step 122, the CTI server 98 translates the CTI command to a PBX command. The PBX command is transmitted to the PBX 96 in step 124. The PBX receives the command and triggers an appropriate PBX action in step 126.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. An internet protocol (IP) telephony system comprising:
a voice switching device providing a plurality of call-related functions;
a server coupled to the voice switching device accessing the plurality of call-related functions; and
an IP telephone coupled to the server, the IP telephone including logic for transmitting to the server a first command associated with a particular call-related function provided by the voice switching device,
wherein the server is adapted to translate the first command to a voice switching device command and transmit the voice switching device command to the voice switching device, the voice switching device providing the particular call-related function to the IP telephone in response to the voice switching device command.

2. The IP telephony system of claim 1, wherein the voice switching device is a private branch exchange (PBX) unit and the voice switching device command is a PBX command.

3. The IP telephony system of claim 1, wherein the server is a computer telephony integration (CTI) server and the voice switching device command is a CTI command.

4. The IP telephony system of claim 1, wherein the IP telephone is a wireless IP telephone, and the IP telephone transmits the first command via a wireless base station coupled to the server.

5. An internet protocol (IP) telephony system comprising:
a voice switching device providing a plurality of call-related functions;
a server coupled to the voice switching device accessing the plurality of call-related functions;
a translator coupled to the server for translating between a first command and a CTI command; and
an IP telephone coupled to the translator, the IP telephone including logic for transmitting to the translator the first command for invoking a particular call-related function provided by the voice switching device,
wherein the translator is adapted to translate the first command to the CTI command and transmit the CTI command to the CTI server,
wherein the server is adapted to translate the CTI command to a third command and transmit the third command to the voice switching device, and
wherein the voice switching device is adapted to provide providing the particular call-related function to the IP telephone in response to the third command.

6. The IP telephony system of claim 5, wherein the translator resides in a stand-alone server.

7. The IP telephony system of claim 5, wherein the translator resides in a H.323 gatekeeper.

8. The IP telephony system of claim 5, wherein the translator resides in a proxy server.

9. The IP telephony system of claim 5, wherein the first command is based on a signaling protocol used by the IP telephone in engaging in IP telephony communication.

10. The IP telephony system of claim 5, wherein the voice switching device is a private branch exchange (PBX) unit and the third command is a PBX command.

11. The IP telephony system of claim 5, wherein the IP telephone is a wireless IP telephone, and the IP telephone transmits the first command via a wireless base station coupled to the translator.

12. In an internet protocol (IP) telephony system including a voice switching device providing a plurality of call-related functions, a CTI server coupled to the voice switching device accessing the plurality of call-related functions, and an IP telephone coupled to the server, the IP telephone comprising:
- an input for allowing a user selection of a particular call-related function provided by the voice switching-device;
- a microprocessor coupled to the input, the microprocessor including logic for receiving the user selection of the particular call-related function and translating the selected function into a first command; and
- an output for transmitting the first command to the CTI server, the CTI server translating the first command into a CTI command and transmitting the CTI command to the voice switching device, the voice switching device pro selected call-related function to the IP telephone in response to the CTI command.

13. The IP telephone of claim 12, wherein the voice switching device is a private branch exchange (PBX) unit.

14. The IP telephone of claim 12, wherein the first command is an IP command.

15. The IP telephone of claim 12, wherein the output is a transmitter for transmitting the first command via a wireless communication medium, and the transmitter transmits the first command via a wireless base station coupled to the CTI server.

16. In an internet protocol (IP) telephony system including a voice switching device providing a plurality of call-related functions, a CTI server coupled to the voice switching device accessing the plurality of call-related functions, a translator coupled to the CTI server for translating between a first command and a CTI command, and an IP telephone coupled to the translator, the IP telephone comprising:
- an input for allowing a user selection of a particular call-related function provided by the voice switching device;
- a microprocessor coupled to the input, the microprocessor including logic for receiving the user selection of the particular call-related function and translating the selected function into a first command; and
- an output for transmitting the first command to the translator, the translator translating the first command to the CTI command and transmitting the CTI command to the CTI server, the CTI server translating the CTI command to a third command and transmitting the third command to the voice switching device, the voice switching device providing the selected call-related function to the IP telephone in response to the third command.

17. The IP telephone of claim 16, wherein the translator resides in a stand-alone server.

18. The IP telephone of claim 16, wherein the translator resides in a H.323 gatekeeper.

19. The IP telephone of claim 16, wherein the translator resides in a proxy server.

20. The IP telephone of claim 16, wherein the first command is based on a signaling protocol used by the IP telephone in engaging in IP telephony communication.

21. The IP telephone of claim 16, wherein the voice switching device is a private branch exchange (PBX) unit and the third command is a PBX command.

22. The IP telephone of claim 16, wherein the output is a transmitter for transmitting the first command via a wireless communication medium, and the transmitter transmits the first command via a wireless base station coupled to the translator.

23. In an internet protocol (IP) telephony system including a voice switching device providing a plurality of call-related functions, a CTI server coupled to the voice switching device accessing the plurality of call-related functions, and an IP telephone coupled to the server, a method for IP telephone operation comprising the steps of:
- receiving a user selection of a particular call-related function provided by the voice switching device;
- translating the selected function into a CTI command;
- transmitting the CTI command to the server;
- translating the CTI command to a second command;
- transmitting the second command to the voice switching device; and
- providing the particular call-related function to the IP telephone upon receipt of the second command.

24. The method of claim 23, wherein the voice switching device is a private branch exchange (PBX) unit and the second command is a PBX command.

25. The method of claim 23, wherein the step of transmitting the CTI command comprises transmitting the CTI command using a wireless communication medium via a wireless base station coupled to the server.

26. In an internet protocol (IP) telephony system including a voice switching device providing a plurality of call-related functions, a CTI server coupled to the voice switching device accessing the plurality of call-related functions, a translator coupled to the server for translating between a first command and a CTI command, and an IP telephone coupled to the translator, a method for IP telephone operation comprising the steps of:
- receiving a user selection of a particular call-related function provided by the voice switching device;
- translating the selected function into a first command;
- transmitting the first command to the translator;
- translating the first command to the CTI command;
- transmitting the CTI command to the CTI server;
- translating the CTI command to a third command;
- transmitting the third command to the voice switching device; and
- providing the selected call-related function to the IP telephone upon receipt of the third command.

27. The method of claim 26, wherein the translator resides in a stand-alone server.

28. The method of claim 26, wherein the translator resides in a H.323 gatekeeper.

29. The method of claim 26, wherein the translator resides in a proxy server.

30. The method of claim 26, wherein the first command is based on a signaling protocol used by the IP telephone in engaging in IP telephony communication.

31. The method of claim 26, wherein the voice switching device is a private branch exchange (PBX) unit and the third command is a PBX command.

32. The method of claim 26, wherein the step of transmitting the first command comprises transmitting the first command using a wireless communication medium via a wireless base station coupled to the translator.

33. An internet protocol (IP) telephony system comprising:
- a voice switching device enabled with CTI for providing a plurality of call-related functions;
- one or more IP telephones, each IP telephone adapted to transmit:
  - a first group of one or more commands consistent with an IP protocol, and
  - a second group of one or more enhanced signaling commands, each of the one or more enhanced signaling commands of the second group being associated with one of the plurality of call-related functions provided by the voice switching device; and
- a CTI server, operatively coupled to the voice switching device and one or more IP telephones, for translating each of the one or more enhanced signaling commands of the second group to a CTI command transmitted to the voice switching device to invoke one of the plurality of call-related functions.

34. The internet protocol (IP) telephony system of claim 33, wherein the IP protocol is a session initiation protocol (SIP).

35. The internet protocol (IP) telephony system of claim 33, wherein the IP protocol is an H.323 protocol.

36. The internet protocol (IP) telephony system of claim 33, wherein the plurality of call-related functions comprises call conferencing.

37. The internet protocol (IP) telephony system of claim 33 wherein the plurality of call-related functions comprises call holding.

38. The internet protocol (IP) telephony system of claim 33, wherein the plurality of call-related functions comprises dial-by-name.

39. The internet protocol (IP) telephony system of claim 33, wherein the voice switching device is a PBX.

* * * * *